US012662096B2

(12) United States Patent
Zhang et al.

(10) Patent No.: US 12,662,096 B2
(45) Date of Patent: Jun. 23, 2026

(54) WIRED BRAKING MODULE, WIRED BRAKING SYSTEM, AND CONTROL METHOD FOR THE SAME

(71) Applicant: Robert Bosch GmbH, Stuttgart (DE)

(72) Inventors: Xiaokun Zhang, Suzhou (CN); Fei Yu, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/989,219

(22) Filed: Dec. 20, 2024

(65) Prior Publication Data

US 2025/0206277 A1 Jun. 26, 2025

(30) Foreign Application Priority Data

Dec. 22, 2023 (CN) .......................... 202311785168.3

(51) Int. Cl.
*B60T 8/58* (2006.01)
*B60T 8/171* (2006.01)
*B60T 8/34* (2006.01)

(52) U.S. Cl.
CPC ................ *B60T 8/58* (2013.01); *B60T 8/171* (2013.01); *B60T 8/341* (2013.01); *B60T 8/344* (2013.01); *B60T 2270/82* (2013.01)

(58) Field of Classification Search
CPC ...... B60T 2270/82; B60T 8/171; B60T 8/326; B60T 8/341; B60T 8/344; B60T 8/4081; B60T 8/58
See application file for complete search history.

(56) References Cited

U.S. PATENT DOCUMENTS

| | | | | |
|---|---|---|---|---|
| 9,956,943 | B2 * | 5/2018 | Alford | .................. B60T 8/4081 |
| 10,654,454 | B2 * | 5/2020 | Ohkubo | .............. B60L 15/2009 |
| 11,268,586 | B2 * | 3/2022 | Bai | ........................ F16D 63/002 |
| 11,332,106 | B2 * | 5/2022 | Mizusaki | .............. B60T 13/686 |
| 12,240,427 | B2 * | 3/2025 | Ganzel | .................. B60T 13/686 |
| 2004/0061375 | A1 * | 4/2004 | Drott | ....................... B60T 7/042 |
| | | | | 303/20 |
| 2006/0220451 | A1 * | 10/2006 | Drumm | ................. B60T 13/147 |
| | | | | 303/114.1 |
| 2023/0001905 | A1 * | 1/2023 | Ying | ....................... B60T 7/042 |
| 2023/0311833 | A1 * | 10/2023 | Ganzel | .................. B60T 13/686 |
| | | | | 303/3 |
| 2025/0100528 | A1 * | 3/2025 | Ullrich | ................... B60T 8/171 |

* cited by examiner

*Primary Examiner* — Carl C Staubach
(74) *Attorney, Agent, or Firm* — Maginot, Moore & Beck LLP

(57) ABSTRACT

A control method for a wired braking system includes, when estimating that the current forward stroke of the main piston cannot satisfy the braking request, executing the current forward stroke until the stroke of the main piston reaches a first threshold, and then cutting off the communication between the master brake cylinder and each of the sub-brake cylinders; retracting the main piston until the master brake cylinder communicates with the reservoir, allowing brake fluid from the reservoir to replenish the master brake cylinder; advancing the main piston again and re-establishing communication between the master brake cylinder and each of the sub-brake cylinders to further increase the brake fluid pressure in each of the sub-brake cylinders; and estimating again whether the current forward stroke can satisfy the braking request.

10 Claims, 7 Drawing Sheets

WIRED BRAKING MODULE, WIRED BRAKING SYSTEM, AND CONTROL METHOD FOR THE SAME

This application claims priority under 35 U.S.C. § 119 to application no. CN 202311785168.3, filed on Dec. 22, 2023 in China, the disclosure of which is incorporated herein by reference in its entirety.

FIELD

The present disclosure relates to the field of vehicle braking, and more specifically to a wired braking module, a wired braking system, and a control method for a wired braking system.

BACKGROUND

Wired braking systems, particularly Electronic Hydraulic Brake Systems (EHB), are a new type of braking system developed from traditional hydraulic braking systems. They are more convenient for integration with systems such as electric vehicles, intelligent driving, or autonomous driving. The main difference between wired braking systems and traditional hydraulic braking systems is the use of an electronic brake pedal instead of a traditional brake pedal, and the replacement of mechanical connections between the brake pedal and the braking module with electronic or communication connections. This achieves decoupling of the electronic brake pedal from the master brake cylinder and enables fully electronic control of braking operations.

On the other hand, the volume of the vehicle's master brake cylinder and the stroke of the main piston within the master brake cylinder need to be designed based on extreme braking conditions. For example, when a vehicle is on a long downhill slope, the driver tends to repeatedly press the electronic brake pedal, which can lead to an increase in the temperature of the brake calipers, a decrease in the friction coefficient, and deformation under pressure. In such cases, a larger amount of brake fluid is required compared to normal road conditions. Even though such conditions are rare, and may not even need to be considered for vehicles used in urban environments, the design of existing master brake cylinders must be capable of handling these conditions.

SUMMARY

An object of the present application is to solve or at least alleviate problems existing in the prior art.

According to one aspect of the present disclosure, a control method for a wired braking system is provided, comprising:

S1. upon receiving a braking request from the electronic brake pedal, driving the main piston in the master brake cylinder forward to compress the brake fluid in the master brake cylinder into the sub-brake cylinders of the brake calipers for each wheel, thereby establishing brake fluid pressure;

The method further comprises:

S2. estimating whether the current forward stroke of the main piston can satisfy the braking request, and executing the current forward stroke until the braking request is satisfied if the result is affirmative, and executing the following steps if the result is negative:

S31. executing the current forward stroke until the stroke of the main piston reaches a first threshold, cutting off the communication between the master brake cylinder and each of the sub-brake cylinders;

S32. retracting the main piston until the master brake cylinder communicates with the reservoir, allowing brake fluid from the reservoir to replenish the master brake cylinder;

S33. advancing the main piston again and re-establishing communication between the master brake cylinder and each of the sub-brake cylinders to further increase the brake fluid pressure in each of the sub-brake cylinders; and S34. returning to step S2.

According to another aspect of the present disclosure, a wired braking system is provided, which executes the method according to any example of the present disclosure.

According to another aspect of the present disclosure, a wired braking module is provided, comprising:

a drive motor;

a first electronic control unit communicatively connected to the drive motor;

a main push rod drivingly connected to the drive motor;

a master brake cylinder provided with a main piston and an auxiliary piston, the main piston and the auxiliary piston dividing the master brake cylinder into a first chamber and a second chamber, with a first return spring between the main piston and the auxiliary piston, and a second return spring between the auxiliary piston and the end wall of the master brake cylinder, wherein the main piston is in contact with the main push rod when in the initial position, and the first chamber and the second chamber are respectively in communication with the reservoir;

wherein, the first electronic control unit is configured to execute the following method upon receiving a braking request from the electronic brake pedal:

controlling the drive motor to drive the main piston in the master brake cylinder forward to compress the brake fluid in the master brake cylinder;

estimating whether the current forward stroke of the main piston can satisfy the braking request, and executing the current forward stroke until the braking request is satisfied if the result is affirmative, and executing the following steps if the result is negative:

executing the current forward stroke until the stroke of the main piston exceeds a predetermined threshold, then sending a first signal to the vehicle body electronic stability module to notify it to disconnect the master brake cylinder from each of the sub-brake cylinders;

retracting the main piston until the master brake cylinder communicates with the reservoir, allowing brake fluid from the reservoir to replenish the master brake cylinder;

advancing the main piston again and sending a second signal to the vehicle body electronic stability module to notify it to control the reconnection of the master brake cylinder with each of the sub-brake cylinders.

The apparatus and method according to the present disclosure address extreme braking conditions through control logic, allowing the wired braking module to be more compact.

BRIEF DESCRIPTION OF THE DRAWINGS

Referring to the drawings, the disclosure of the present application will become more easily understood. It will be readily understood by those skilled in the art that these drawings are for purposes of illustration only and are not intended to limit the scope of protection of the present application. Additionally, similar numerals in the drawings are used to represent similar components, wherein.

DETAILED DESCRIPTION

Figure 1:
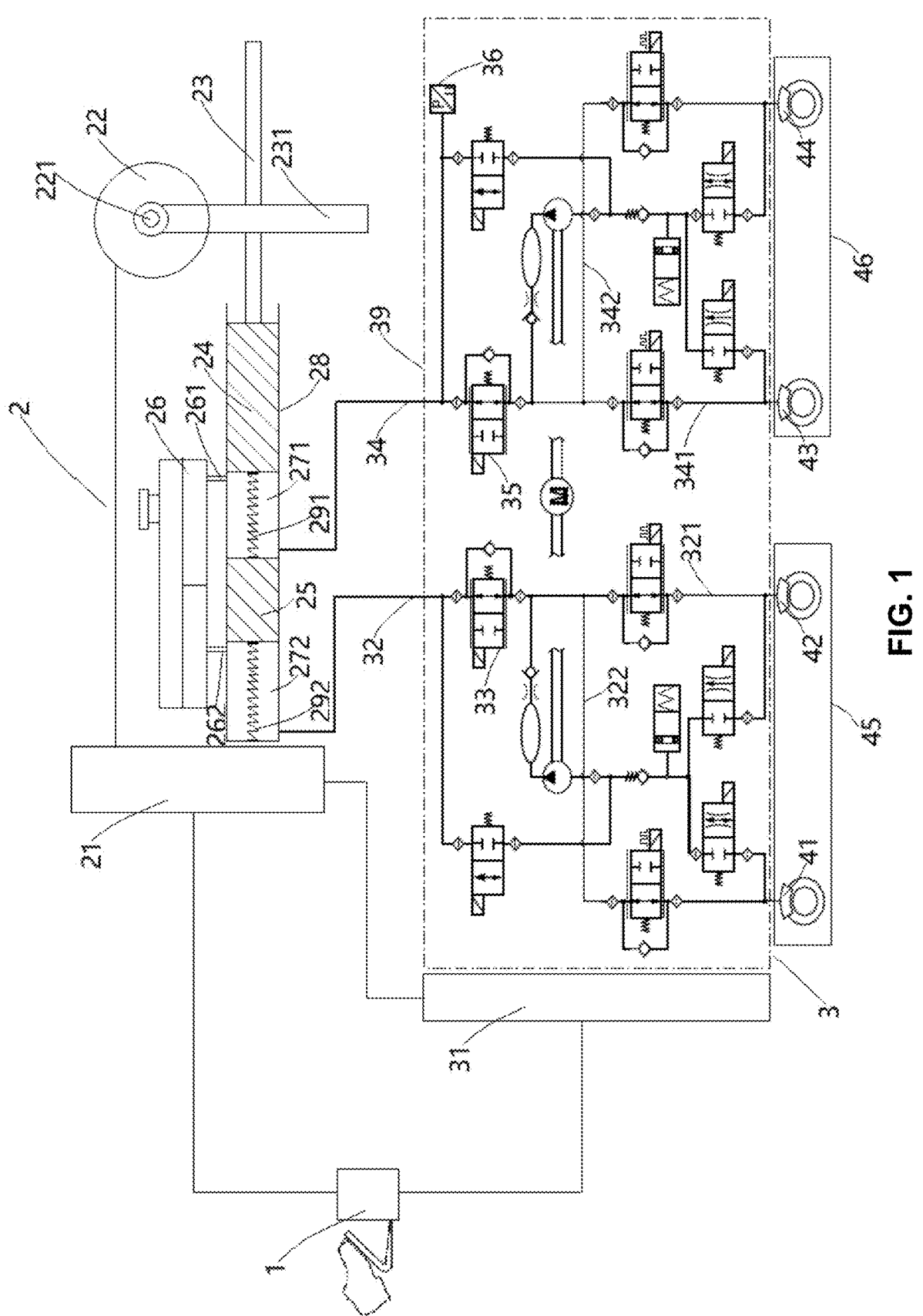
FIGS. 1 to 6 illustrate schematic diagrams of the structure of a wired braking system according to examples of the present disclosure at various stages of implementing the control method according to the examples.
Figure 2:
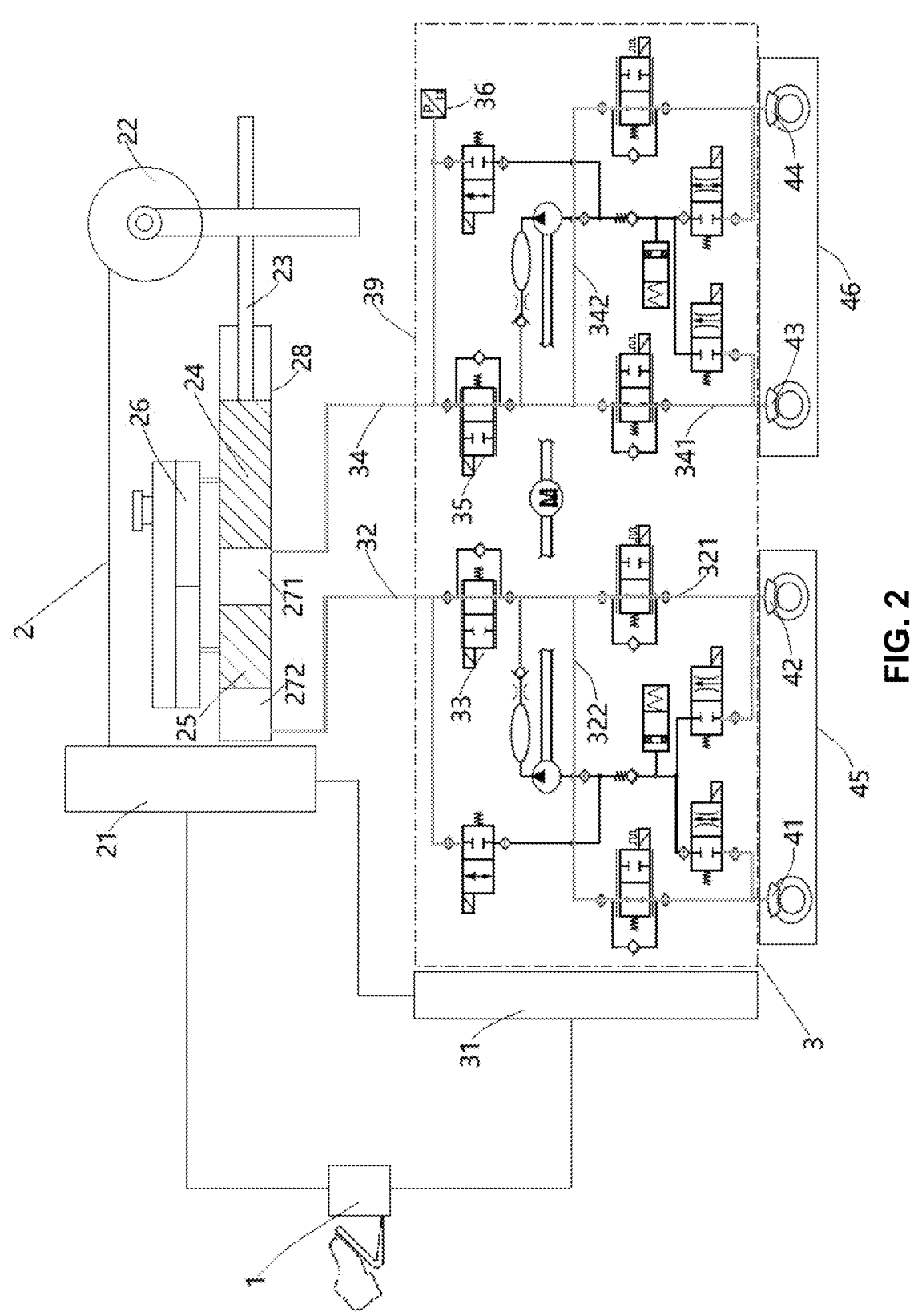

First, referring to FIGS. 1 to 7, a wired braking system and its control method according to an example of the present disclosure are introduced. The wired braking system can comprise a wired braking module 2 and a vehicle body electronic stability module 3. In addition to the wired braking system, the vehicle braking assembly further comprises an electronic brake pedal 1 and brake calipers 41, 42, 43, 44 for the four wheels of the vehicle. The electronic brake pedal 1 can be equipped with or without pedal feel or pedal travel, and the control signals of the electronic brake pedal 1 can comprise, for example, brake pedal travel, angle, or brake pedal pressure. Each brake caliper adopts a hydraulic brake caliper, each having sub-hydraulic cylinders 41, 42, 43, 44. The wired braking module 2 can comprise: a drive motor 22; a first electronic control unit 21 communicatively connected to the drive motor 22; a main push rod 23 drivingly connected to the drive motor 22, for example, the output shaft 221 of the drive motor 22 and the gear 231 form a worm gear mechanism, the gear 231 and the main push rod 23 form a screw nut mechanism, thereby allowing the drive motor 22 to advance or retract the main push rod 23; a master brake cylinder 28, in which a main piston 24 and an auxiliary piston 25 are disposed, dividing the master brake cylinder 28 into a first chamber 271 and a second chamber 272, with a first return spring 291 and a second return spring 292 (only shown in FIG. 1) disposed between the main piston 24 and the auxiliary piston 25 and between the auxiliary piston 25 and the end wall of the master brake cylinder 28. When the main piston 24 is in the initial position (the drive motor 22 is in the initial position), the main piston 24 contacts the main push rod 23, and the first chamber 271 and the second chamber 272 are respectively in communication with the reservoir 26, for example, through independent pipelines 261, 262 communicating with the reservoir 26. It should be understood that seals are disposed near the ports where the pipelines 261, 262 enter the brake cylinder 28, so that when the main piston 24 and the auxiliary piston 25 move leftward beyond the respective ports, the first chamber 271 and the second chamber 272 will be sealed from the reservoir 26.

The vehicle body electronic stability module 3 comprises: a first passage 34 and a second passage 32, respectively fluidly connecting the first chamber 271 and the second chamber 272 to the two sub-brake cylinders of the brake calipers of two wheels. More specifically, the first passage 34 connects the first chamber 271 and branches into a first branch 341 and a second branch 342 to connect to the first sub-brake cylinder 43 and the second sub-brake cylinder 44 in the first brake circuit 46, which can be the brake cylinders of the brake calipers for the left front wheel and the right rear wheel, respectively. Similarly, the second passage 32 connects the second chamber 272 and branches into a third branch 321 and a fourth branch 322 to connect to the third sub-brake cylinder 41 and the fourth sub-brake cylinder 42 in the second brake circuit 45, which can be the brake cylinders of the brake calipers for the left rear wheel and the right front wheel, respectively. A first main valve 35 and a second main valve 33 are respectively disposed on the first passage 34 and the second passage 32, and a second electronic control unit 31 is communicatively connected to the first main valve 35 and the second main valve 33. A pressure sensor 36 is connected to the first main valve 35 on the master brake cylinder side of the first passage 34 (arranged as such in the illustrated example) or the second main valve 33 on the master brake cylinder side of the second passage 32, thereby monitoring the brake fluid pressure on the master brake cylinder side of the first main valve 35 of the first passage 34 or the second main valve 33 of the second passage 32. In addition to the parts described above, the vehicle body electronic stability module 3 further comprises other components for achieving vehicle body stability functions, which are not elaborated here.

Furthermore, in the wired braking system, the first electronic control unit 21 and the second electronic control unit 31 are communicatively connected. The electronic brake pedal 1 is communicatively connected to both the first electronic control unit 21 and the second electronic control unit 31. Additionally, although not shown, the electronic brake pedal 1, the first electronic control unit 21, and the second electronic control unit 31 can be electrically connected to a first power source and a second power source, respectively, thereby providing power to all three, where the first power source may be the main power source, and the second power source is a backup power source. From the above description, it is evident that in the wired braking system according to the example of the present application, the electronic brake pedal 1 is only communicatively connected to the wired braking module 2, and the main push rod 23 relies entirely on the drive motor 22 for actuation. In contrast, in traditional mechanical pedals, the brake pedal 1 is mechanically coupled to the main push rod 23, such that pressing the brake pedal 1 directly pushes the main push rod 23, with the motor only providing auxiliary assistance.

In the wired braking module 2, in step S1, upon receiving a braking request from the electronic brake pedal 1, the first electronic control unit 21 controls the drive motor 22 to rotate forward and advances the main push rod 23 through the transmission mechanism. The main push rod 23 further advances the main piston 24 in the master brake cylinder 28 to compress the brake fluid in the master brake cylinder, for example, the brake fluid in the first chamber 271 and the second chamber 272 enters the sub-brake cylinders 41, 42, 43, 44 of the brake calipers for each wheel, thereby establishing brake fluid pressure. Upon receiving a release brake request from the electronic brake pedal 1, the first electronic control unit 21 controls the drive motor 22 to reverse and retract the main push rod 23 through the transmission mechanism, at which point the main piston 24 and the auxiliary piston 25 return to the initial position due to the elastic force of the first and second return springs 291, 292.

Figure 6:
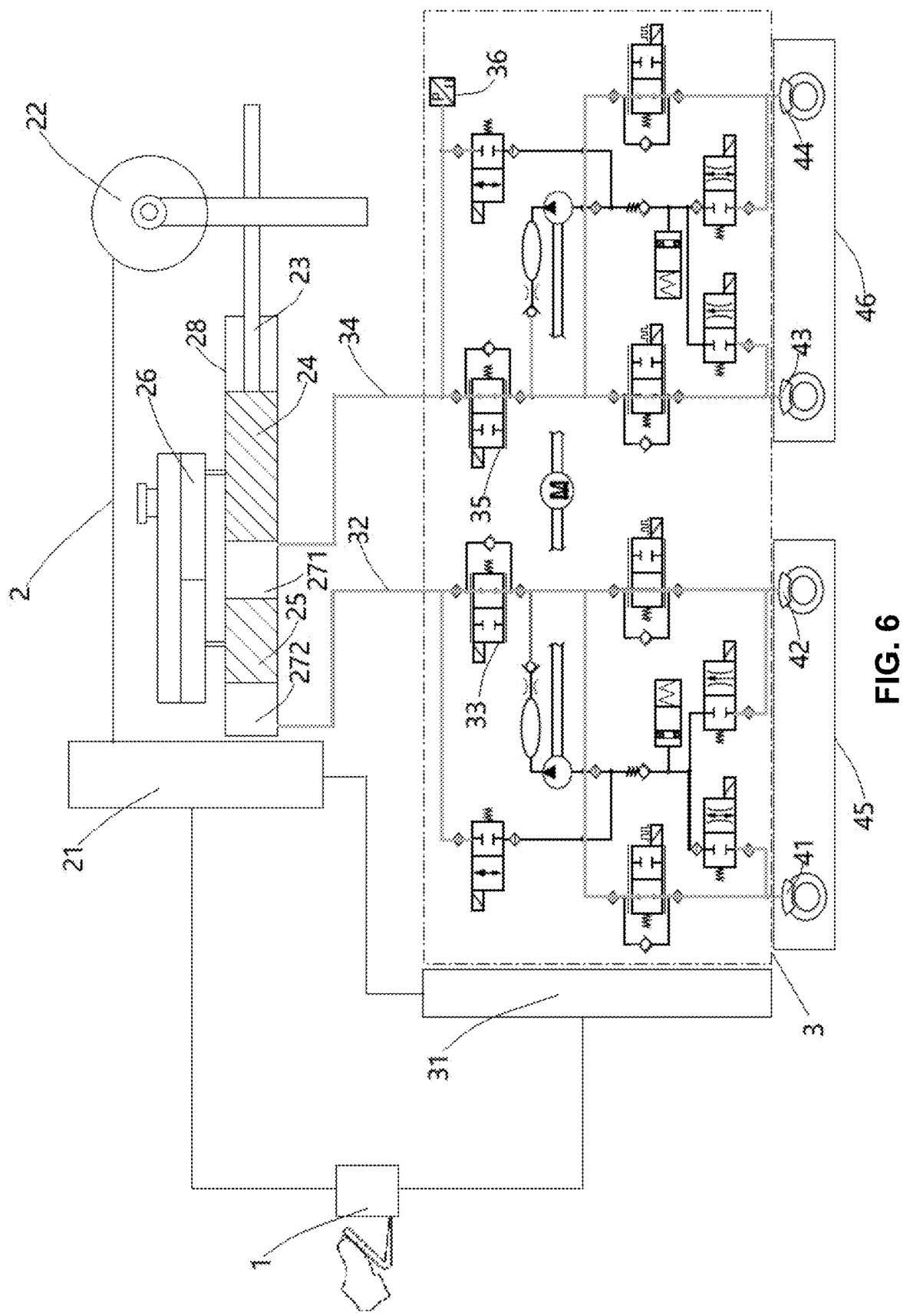
Figure 7:
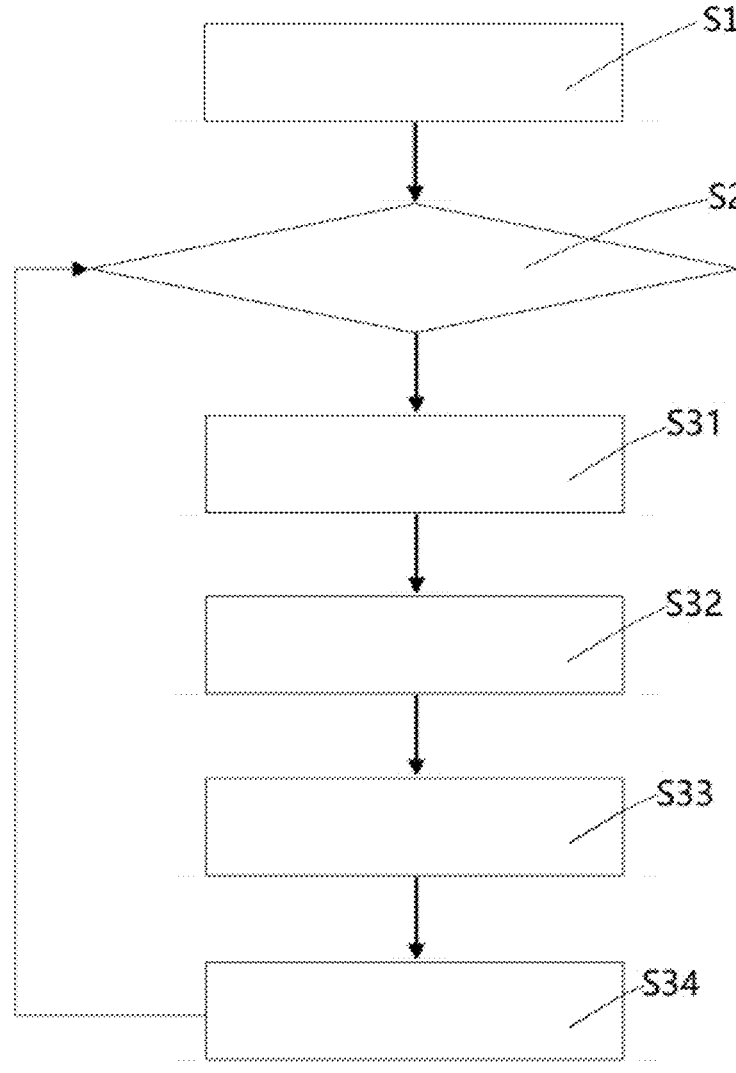
FIG. 7 illustrates a flowchart of the control method for a wired braking system according to an example of the present disclosure.

Next, with reference to FIG. 7, a control method for a wired braking system is introduced. In the wired braking system shown in FIGS. 1 to 6, the main entities executing this method are both the first electronic control unit 21 of the wired braking module 2 and the second electronic control unit 31 of the vehicle body electronic stability module 3. Specifically, the method is primarily executed by the first electronic control unit 21, while the steps involving the disconnection and communication of the passage between the master brake cylinder and the sub-brake cylinder can be executed by the second electronic control module 31 upon notification from the first electronic control unit 21. In alternative examples, the method can also be executed by a single electronic control unit, control device, or processor. For example, the first electronic control unit 21 and the second electronic control unit 31 can be integrated together. Therefore, the executing entity of the control method of the present disclosure is not limited by specific examples. The control method for the wired braking system comprises: S1. upon receiving a braking request from the electronic brake pedal 1, driving the main piston in the master brake cylinder forward to compress the brake fluid in the master brake cylinder into the sub-brake cylinders of the brake calipers for each wheel, thereby establishing brake fluid pressure. It should be understood that although a master brake cylinder with a main piston and an auxiliary piston is illustrated, the method of the present disclosure can be applied to master brake cylinders of various structures.

After step S1, step S2 can be executed, estimating whether the current forward stroke of the main piston can satisfy the braking request, and executing the current forward stroke until the braking request is satisfied if the result is affirmative, and executing the following steps if the result is negative: In the master brake cylinder of the present disclosure, the main piston, auxiliary piston, and master brake cylinder are configured such that a single forward stroke of the main piston and auxiliary piston can only meet the braking needs of conventional operating conditions, rather than extreme braking conditions such as long downhill conditions. For extreme braking conditions, the method described below is used to address them. Therefore, compared to conventional products, the length of the master brake cylinder in the examples of the present disclosure can be shorter, and the single stroke of the main piston and auxiliary piston can also be shorter, thereby achieving a more compact wired braking module. Nevertheless, the single forward stroke of the main piston and auxiliary piston can meet most conventional operating conditions. Therefore, in most cases, the judgment result will be affirmative, and the main piston will advance to a predetermined position according to the conventional control method to execute braking. For example, taking the state shown in FIG. 2 as an example, when the main piston 24 moves to the illustrated position, the pipeline with high-pressure brake fluid is shown in light color in the figure. The high-pressure brake fluid can enter the sub-brake cylinders 41, 42, 43, 44 of the brake calipers for each wheel to provide a braking force corresponding to the current braking request. Furthermore, if the judgment result is negative, steps S31 to S34 are executed. In some examples, step S2 comprises collecting one or more parameters during the forward stroke of the main piston and estimating whether the maximum stroke of the main piston can satisfy the braking request based on a comparison of the collected one or more parameters with historical parameters or preset parameters. The one or more parameters are selected from vehicle speed, vehicle deceleration, the stroke of the main push rod 23, the rotor position of the drive motor 22, the brake fluid pressure in the sub-brake cylinder, and/or the braking torque, etc.

It should be understood that parameters such as the volume of the vehicle's master brake cylinder, the volume of the sub-brake cylinder, and the length of the pipeline between the master brake cylinder and the sub-brake cylinder are known and determined parameters on the vehicle. Other parameters, such as the friction coefficient of the brake caliper's friction pads and the thickness of the friction pads, may change under extreme conditions. Based on the aforementioned known and determined parameters, under general conditions, there is a corresponding relationship between the position of the main piston 24 and the braking torque applied by the brake calipers. These corresponding parameters can be preset in the first electronic control unit 21 as preset parameters. On the other hand, the first electronic control unit 21 can also periodically collect the corresponding relationship between the position of the main piston 24 and the braking torque applied by the brake calipers under conventional conditions and store it as historical data (which can be updated periodically). On the other hand, there can also be a corresponding relationship between the position of the main piston 24 and the stroke or pressure of the electronic brake pedal 1. Therefore, in the specific judgment method of step S2, when the stroke or pressure of the electronic brake pedal 1 is small, for example, when the corresponding position of the main piston is less than a certain proportion R (e.g., 80%, 70%, and 60%) of the maximum forward stroke of the main piston, it can be directly determined that the current forward stroke of the main piston can satisfy the braking request because there is a large margin in the forward stroke of the main piston itself. Conversely, when the stroke or pressure of the electronic brake pedal 1 is large, for example, when the corresponding position of the main piston is greater than or equal to the proportion R (e.g., 80%, 70%, and 60%) of the maximum forward stroke of the main piston, one or more of the above parameters, such as deceleration, can be collected when the main piston 24 advances to the position corresponding to the proportion R. The collected deceleration is compared with the deceleration preset or historical value in the system when the main piston is at that position under conventional conditions. Based on this comparison, it is estimated whether the current braking request can be satisfied before the main piston continues the forward stroke to the maximum forward stroke. More specifically, taking the proportion R as 80% as an example, if the depth or force of the driver's depression of the brake pedal corresponds to 90% of the maximum forward stroke of the main piston, when the main piston moves to 80% of the maximum forward stroke, the current actual deceleration is detected and compared with the preset or historical value of deceleration. If the two are equal, it is determined that the main piston can satisfy the current braking request when it moves to 90%. If the actual deceleration is only 70% of the preset or historical value, it can be estimated that even if the current piston forward stroke reaches 100%, the braking request cannot be satisfied, and steps S31 to S34 will be executed. In some examples, step S2 comprises collecting one or more parameters when the stroke of the main piston reaches a second threshold, which is between 80% and 90% of the maximum stroke of the main piston. It should be understood that the aforementioned determination method is merely exemplary. Those skilled in the art are familiar with various methods for controlling the main piston stroke based on a braking request and can estimate whether the current stroke can satisfy the braking request through various mathematical models, based on feedback from parameters collected at a fixed position or real-time feedback of collected parameters. Therefore, the implementation of step S2 is not limited to the examples provided above.

Figure 3:
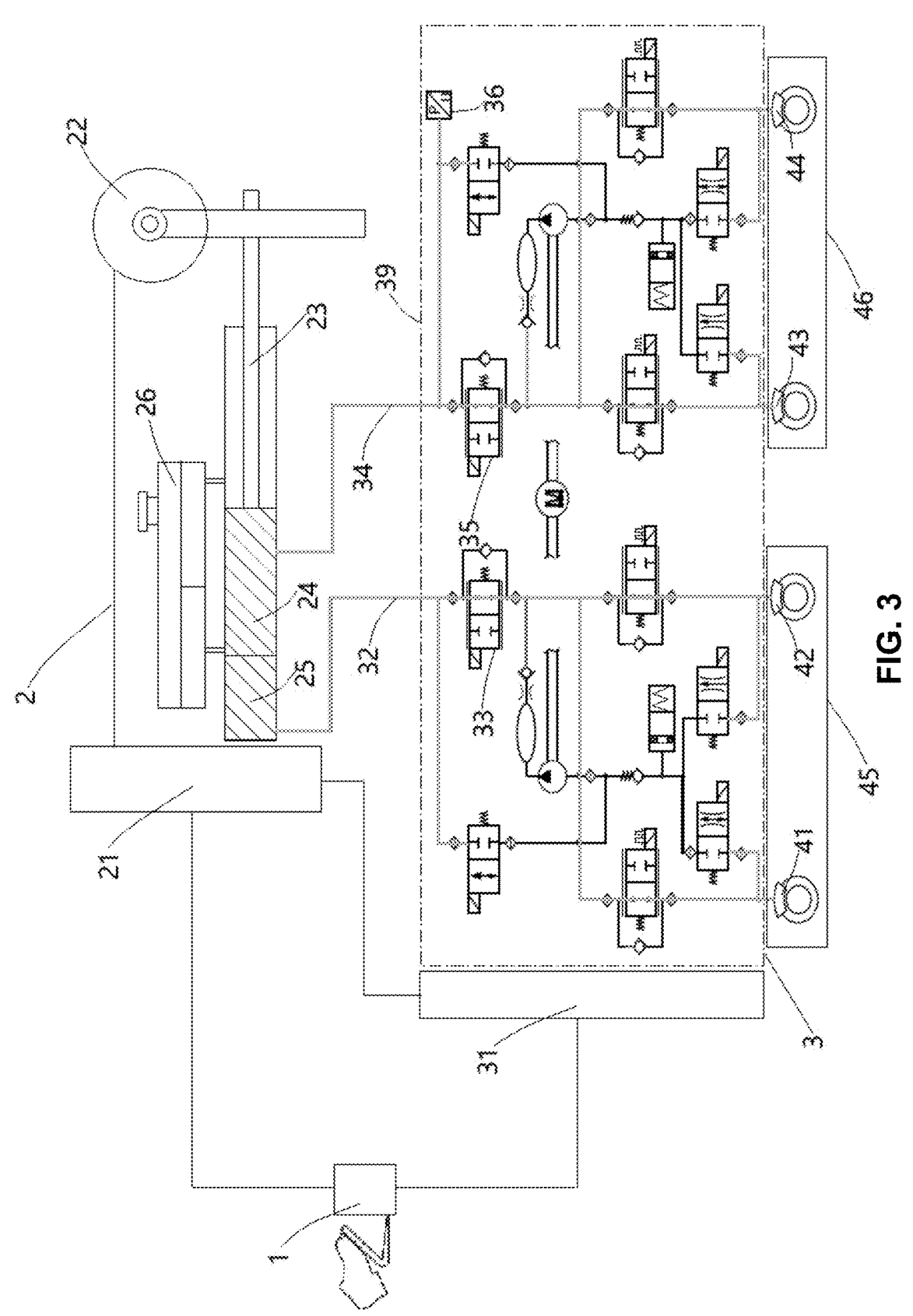

When it is determined that the current maximum forward stroke of the main piston cannot satisfy the braking request, the following steps can be executed: S31. executing the current forward stroke until the stroke of the main piston reaches a first threshold, cutting off the communication between the master brake cylinder and each of the sub-brake cylinders; S32. retracting the main piston until the master brake cylinder communicates with the reservoir, allowing brake fluid from the reservoir to replenish the master brake cylinder; S33. advancing the main piston again and re-establishing communication between the master brake cylinder and each of the sub-brake cylinders to further increase the brake fluid pressure in each of the sub-brake cylinders; and S34. returning to step S2. In some examples, the first threshold is set between 80% and 100% of the maximum forward stroke of the main piston. For example, as shown in FIG. 3, the first threshold can be 100% of the maximum forward stroke of the main piston, at which point the brake fluid in the first chamber and the second chamber is substantially transferred to the first passage 34 and the second passage 32, as well as to each sub-brake cylinder. At this point, the communication between the main brake cylinder and each sub-brake cylinder is cut off, which can be achieved by cutting off the ports of the main brake cylinder or each sub-brake cylinder, or the pipeline between them. In the example of the present disclosure, a first main valve 35 and a second main valve 33 are respectively disposed on the first passage 34 and the second passage 32, and step S31 comprises closing the first main valve 35 and the second main valve 33. After the first main valve 35 and the second main valve 33 are closed, the brake fluid in the pipeline on the side of the sub-brake cylinders and in the sub-brake cylinders remains under high pressure, thereby maintaining the braking torque of each wheel. Even during the subsequent retraction of the main piston in S32, the pressure in each sub-brake cylinder will not be affected. In some examples, step S31 further comprises recording a first pressure $P_1$ of the brake fluid in the first passage 34 or the second passage 32 before the main piston stroke reaches the first threshold and before closing the first main valve 35 and the second main valve 33. This step can be performed by a pressure sensor 36 connected to the first passage 34.

Figure 4:
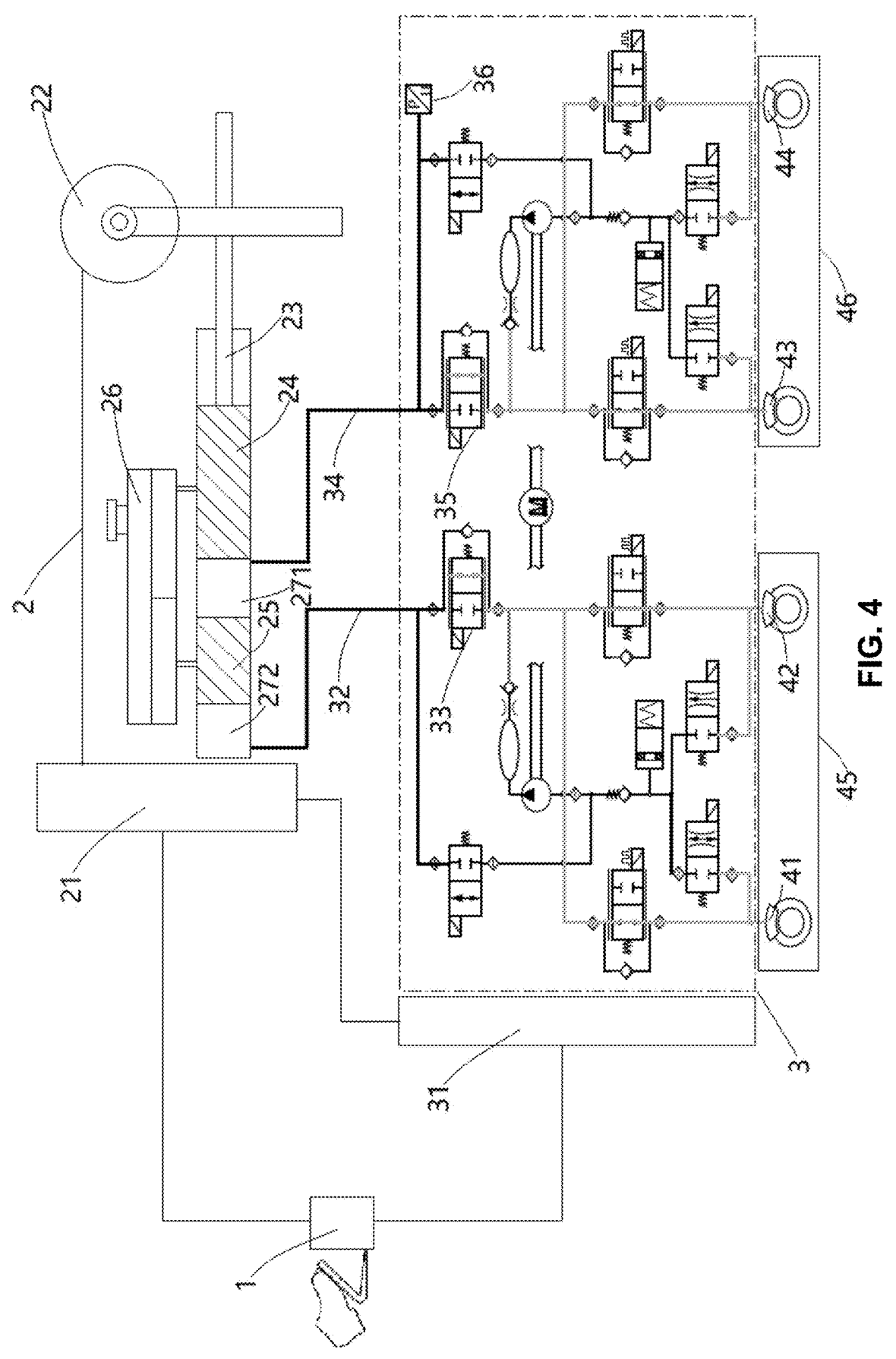
Figure 5:
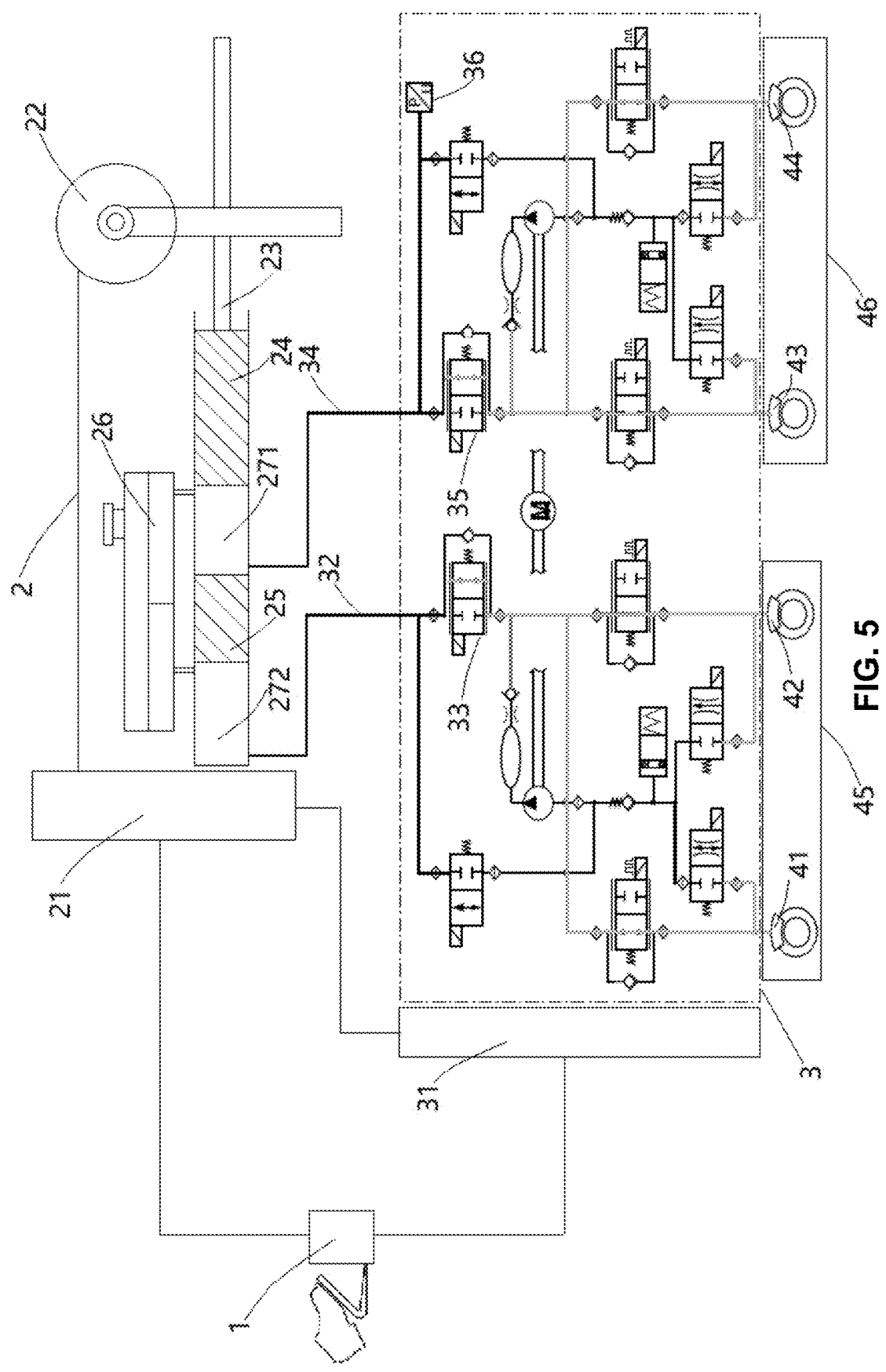

After step S31 is completed, as shown in FIG. 4 and FIG. 5, step S32 is executed. The main piston is retracted until the main brake cylinder communicates with the reservoir (the state shown in FIG. 5), so that the brake fluid in the reservoir is replenished into the main brake cylinder, for example, into the first chamber 271 and the second chamber 272. This step can be achieved by reversing the drive motor 22 back to the initial position, causing the main push rod 23 to return to the initial position, at which point the main piston 24 and the auxiliary piston 25 return to the initial position under the action of the return spring. As can be seen from the figures, in this step, the brake fluid on the side of the main brake cylinder of the first main valve 35 and the second main valve 33, as well as in the first chamber 271 and the second chamber 272, will be in a low-pressure state. In some examples, to avoid generating a large negative pressure, the first threshold can alternatively be set to 95% or another suitable value of the maximum forward stroke of the main piston, so that some brake fluid remains in the main brake cylinder. In the state shown in FIG. 5, the brake fluid in the reservoir 26 will be replenished into the main brake cylinder, for example, into its first chamber 271 and second chamber 272.

After step S32 is completed, as shown in FIG. 6, step S33 is executed. The main piston 24 is advanced again, and the main brake cylinder is reconnected with each sub-brake cylinder to further increase the brake fluid pressure in each sub-brake cylinder. In some examples, step S33 comprises monitoring the second pressure $P_2$ of the brake fluid on the side of the main brake cylinder of the first main valve 35 in the first passage or the second main valve 33 in the second passage during the re-advancement of the main piston 24. When the second pressure $P_2$ is equal to or greater than the first pressure $P_1$, the first main valve 35 and the second main valve 33 are opened to reconnect the main brake cylinder with each sub-brake cylinder. The second pressure $P_2$ can also be detected by a pressure sensor 36 communicating with the side of the main brake cylinder of the first main valve 35 on the first passage 34. This pressure comparison step prevents reverse flow of the brake fluid and the resulting reduction in braking force. After step S33, step S34 is executed, which returns to step S2 to determine whether the second forward stroke can satisfy the braking request. Generally, in extreme cases, the main piston 24 may need to perform two or even three forward strokes, i.e., execute step S31 to S34 once or twice. Correspondingly, the length of the main brake cylinder and the stroke of the main push rod can even be reduced to ½ or even shorter than that of existing products. Therefore, according to another aspect of the present disclosure, a wired braking system is provided that executes the method according to the various examples, allowing the length of its main brake cylinder and/or the stroke of the main push rod to be reduced to even ½ of existing products.

According to yet another aspect, a wired braking module 2 is provided, which comprises: a drive motor 22; a first electronic control unit 21 communicatively connected to the drive motor 22; a main push rod 23 drivingly connected to the drive motor 22; a main brake cylinder 28, in which a main piston 24 and an auxiliary piston 25 are disposed, dividing the main brake cylinder into a first chamber 271 and a second chamber 272. When the main piston is in the initial position, the main piston 24 contacts the main push rod 23, and the first chamber 271 and the second chamber 272 respectively communicate with a reservoir 26; wherein the first electronic control unit 21 is configured to execute the following method upon receiving a braking request from an electronic brake pedal 1: controlling the drive motor to drive the main piston in the master brake cylinder forward to compress the brake fluid in the master brake cylinder; estimating whether the current forward stroke of the main piston can satisfy the braking request, and executing the current forward stroke until the braking request is satisfied if the result is affirmative, and executing the following steps if the result is negative: executing the current forward stroke until the stroke of the main piston exceeds a predetermined threshold, then sending a first signal to the vehicle body electronic stability module to notify it to disconnect the master brake cylinder from each of the sub-brake cylinders; retracting the main piston until the master brake cylinder communicates with the reservoir, allowing brake fluid from the reservoir to replenish the master brake cylinder; and advancing the main piston again.

The specific examples described above in the present application are merely to more clearly describe the principles of the present application, wherein various components are clearly shown or described to make the principles of the present disclosure easier to understand. Within the scope of the present application, those skilled in the art can easily make various modifications or changes to the present application. Therefore, it should be understood that these modifications or changes are all comprised within the scope of the patent protection of the present application.

The invention claimed is:

1. A control method for a wired braking system, comprising:

upon receiving a braking request from an electronic brake pedal, driving a main piston in a master brake cylinder forward to compress brake fluid in the master brake cylinder into sub-brake cylinders of brake calipers for each wheel, thereby establishing brake fluid pressure; estimating whether a current forward stroke of the main piston can satisfy the braking request;

when a result of the estimation is affirmative, executing the current forward stroke until the braking request is satisfied, and when the result of the estimation is negative:

executing the current forward stroke until the stroke of the main piston reaches a first threshold, cutting off communication between the master brake cylinder and each of the sub-brake cylinders;

retracting the main piston until the master brake cylinder communicates with a reservoir, allowing brake fluid from the reservoir to replenish the master brake cylinder;

advancing the main piston again and re-establishing communication between the master brake cylinder and each of the sub-brake cylinders to further increase the brake fluid pressure in each of the sub-brake cylinders; and returning to the estimating of whether the current forward stroke can satisfy the braking request.

2. The method according to claim 1, wherein the first threshold is between 80% and 100% of a maximum forward stroke of the main piston.

3. The method according to claim 1, wherein the estimating of whether the current forward stroke can satisfy the braking request comprises:

collecting one or more parameters during the forward stroke of the main piston; and estimating whether the current forward stroke of the main piston can satisfy the braking request based on a comparison of the collected one or more parameters with historical or preset parameters, wherein the one or more parameters include at least one of: vehicle speed, vehicle deceleration, main push rod stroke, drive motor rotor position, brake fluid pressure in the sub-brake cylinders, and braking torque.

4. The method according to claim 3, wherein the estimating of whether the current forward stroke can satisfy the braking request further comprises:

collecting one or more parameters when the stroke of the main piston reaches a second threshold, which is between 80% and 90% of a maximum forward stroke of the main piston.

5. The method according to claim 1, wherein:

the master brake cylinder comprises:

a first chamber;

a second chamber;

a first passage connecting the first chamber to a first sub-brake cylinder of the sub-brake cylinders and to a second sub-brake cylinder of the sub-brake cylinders;

a second passage connecting the second chamber is connected to a third sub-brake cylinder of the sub-brake cylinders and to a fourth sub-brake cylinder of the sub-brake cylinders via a second passage;

a first main valve disposed on the first passage; and a second main valve disposed on the second passage, wherein the executing of the current forward stroke when the result of the estimation is negative comprises closing the first main valve and the second main valve.

6. The method according to claim 5, wherein the executing of the current forward stroke when the result of the estimation is negative further comprises recording a first pressure of the brake fluid in the first passage or the second passage before the stroke of the main piston reaches the first threshold and before closing the first main valve and the second main valve.

7. The method according to claim 6, wherein the advancing of the main piston again comprises:

monitoring a second pressure of the brake fluid on a side of the main brake cylinder of the first main valve of the first passage or the second main valve of the second passage during the advancing of the main piston, and opening the first main valve and the second main valve when the second pressure is equal to or greater than the first pressure.

8. A wired braking system configured to execute the method according to claim 1.

9. A wired braking system comprising:

a wired braking module, which comprises:

a drive motor;

a first electronic control unit communicatively connected to the drive motor;

a main push rod drivingly connected to the drive motor;

a master brake cylinder comprising:

a main piston;

an auxiliary piston, the main piston and the auxiliary piston dividing the master brake cylinder into a first chamber and a second chamber;

a first return spring arranged between the main piston and the auxiliary piston; and a second return spring arranged between the auxiliary piston and an end wall of the master brake cylinder, wherein, in an initial position, the main piston is in contact with the main push rod and the first chamber and the second chamber are respectively in communication with a reservoir; and a vehicle body electronic stability module comprising:

a first passage fluidly connecting the first chamber to a first sub-brake cylinder and to a second sub-brake cylinder;

a second passage fluidly connecting the second chamber to a third sub-brake cylinder and a fourth sub-brake cylinder;

a first main valve disposed on the first passage;

a second main valve disposed on the second passage;

a second electronic control unit communicatively connected to the first main valve and the second main valve; and a pressure sensor monitoring the brake fluid pressure on a side of the main brake cylinder of the first main valve of the first passage or the second main valve of the second passage, wherein the first electronic control unit and the second electronic control unit are communicatively connected and are configured to:

upon receiving a braking request from an electronic brake pedal, drive the main piston forward to compress brake fluid in the master brake cylinder into the first, second, third, and fourth sub-brake cylinders, thereby establishing brake fluid pressure;

estimate whether a current forward stroke of the main piston can satisfy the braking request;

when a result of the estimation is affirmative, executing the current forward stroke until the braking request is satisfied, and when the result of the estimation is negative:

execute the current forward stroke until the stroke of the main piston reaches a first threshold, then cutting off communication between the master brake cylinder and each of the sub-brake cylinders;

retract the main piston until the master brake cylinder communicates with a reservoir, allowing brake fluid from the reservoir to replenish the master brake cylinder;

advance the main piston again and re-establishing communication between the master brake cylinder and each of the sub-brake cylinders to further increase the brake fluid pressure in each of the sub-brake cylinders; and return to the estimating of whether the current forward stroke can satisfy the braking request.

10. A wired braking module, comprising:

a drive motor;

a first electronic control unit communicatively connected to the drive motor;

a main push rod drivingly connected to the drive motor;

a master brake cylinder comprising:

a main piston;

an auxiliary piston, the main piston and the auxiliary piston dividing the master brake cylinder into a first chamber and a second chamber;

a first return spring arranged between the main piston and the auxiliary piston; and a second return spring arranged between the auxiliary piston and an end wall of the master brake cylinder, wherein, in an initial position, the main piston is in contact with the main push rod and the first chamber and the second chamber are respectively in communication with a reservoir; and wherein, upon receiving a braking request from an electronic brake pedal, the first electronic control unit is configured to:

control the drive motor to drive the main piston in the master brake cylinder forward to compress brake fluid in the master brake cylinder;

estimate whether a current forward stroke of the main piston can satisfy the braking request;

when a result of the estimation is affirmative, executing the current forward stroke until the braking request is satisfied, and when the result of the estimation is negative:

execute the current forward stroke until the stroke of the main piston exceeds a predetermined threshold, then send a first signal to a vehicle body electronic stability module to notify the vehicle body electronic stability module to disconnect the master brake cylinder from each of a plurality of sub-brake cylinders;

retract the main piston until the master brake cylinder communicates with the reservoir, allowing brake fluid from the reservoir to replenish the master brake cylinder; and advance the main piston again and sending a second signal to the vehicle body electronic stability module to notify the vehicle body electronic stability module to reconnect of the master brake cylinder with each of the plurality of sub-brake cylinders.

* * * * *